W. Ball,

Cage Trap.

No. 106,107. Patented Aug. 9, 1870.

Witnesses:

Inventor:

United States Patent Office.

WILLIAM BALL, OF OREGON, MISSOURI.

Letters Patent No. 106,107, dated August 9, 1870.

IMPROVED ANIMAL-TRAP.

The Schedule referred to in these Letters Patent and making part of the same

*To all whom it may concern:*

Be it known that I, WILLIAM BALL, of Oregon, in the county of Holt and State of Missouri, have invented a new and improved Animal-Trap; and I do hereby declare that the following is a full, clear, and exact description thereof, which will enable others skilled in the art to make and use the same, reference being had to the accompanying drawing forming part of this specification.

This invention relates to improvements in animal-traps, and consists mainly in an arrangement, in a vertical cylindrical case, divided horizontally into two compartments, of a vertical shaft, with wings in one of the said compartments, dividing it into several sections, and having a coiled spring attached to it, tending to revolve it. Each section is provided with bait-hooks arranged to trip the spring-restraining devices, and an opening in the inside of the case admits the animals to one of the sections, where, by nibbling the bait, he trips the spring-holder, and is carried past the opening to a dark space, and another section is brought opposite the opening; from the dark space openings, guarded by falling doors, lead to the compartment above or below, where the animals, seeing light, will go, and be retained until taken out.

Similar letters of reference indicate corresponding parts.

Figure 1:
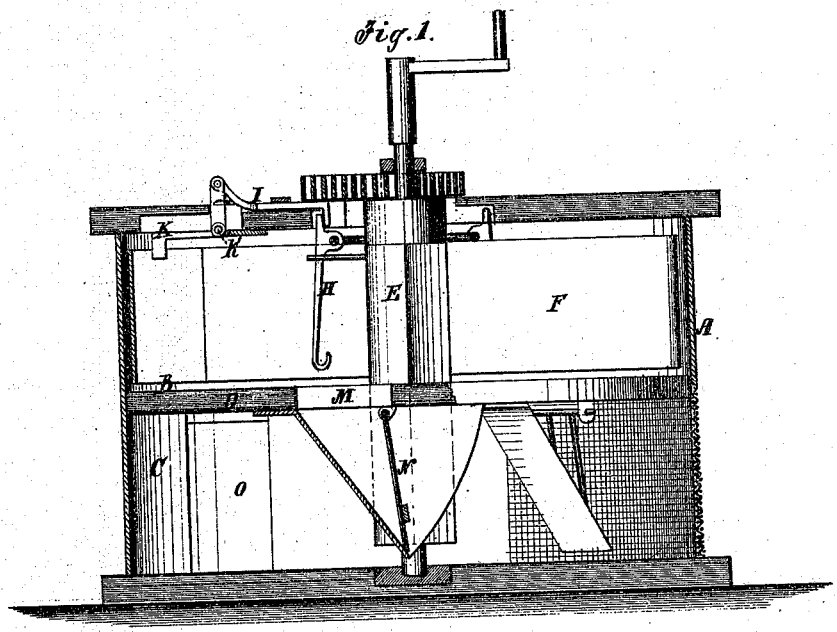
Figure 1 is a transverse sectional elevation of my improved trap.
Figure 2:
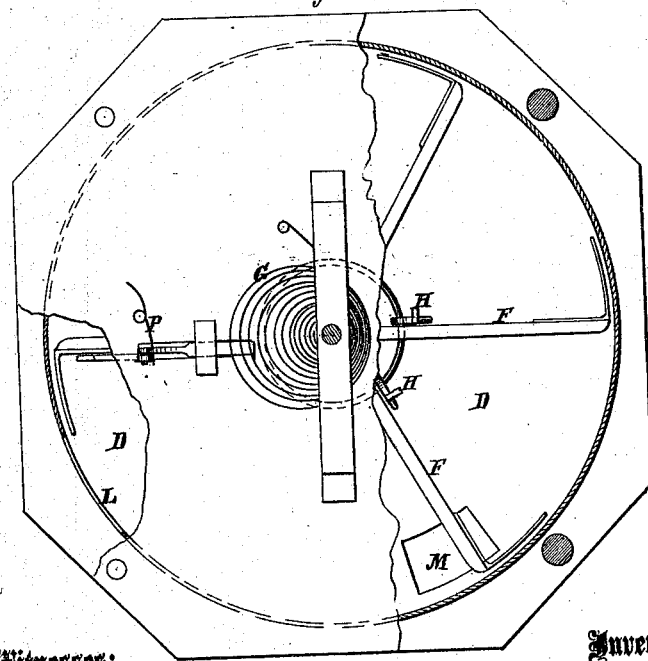
Figure 2 is a plan with the top partly broken away.

A is a vertical cylinder divided into two compartments, B C, by the floor D. The upper compartment has a vertical shaft, E, carrying radial wings, F, as large as will turn within it.

G is a coiled spring connected to the shaft and the case, to be contracted and to force the shaft around.

H are bait-hooks, one for each section, between the wings, and pivoted near the upper ends, which are flattened, and act upon the bent ends of the slide I, carrying the tripping-catch K, which, dropping before the upper edges of the wings F, hold them against the action of the spring. It is arranged in the top of the case, near the opening L, in the side of the case, for the animals to enter. The bait-hook for each section engages with this slide when its section arrives at the opening L.

One or more openings, M, are made through the floor D to the space below, and they are guarded by wire drop-doors N, to prevent the passage from the space C above.

The rim of the compartment C is made to admit the light, and has an opening and door for taking the animals out.

The animals, entering at L, and attacking the bait, will draw the slide I back and tilt the catch K on its pivot K', so as to release the wing which it holds. The spring will then force the shaft and wings around, carrying the animal beyond the opening L, into a dark space, where he only sees light from below, through the openings M, by which, seeking escape, he is induced to descend, and is thereby delivered from the trap, which, by the return movement of the slide I, caused by a spring, P, is set again, and so on a great number of times, depending only upon the length of the spring G.

Having thus described my invention,

I claim as new and desire to secure by Letters Patent—

The combination of vertical cylinder A, having two compartments, B C, floor D, openings M, and drop-doors N, vertical shaft E, radial wings F, coiled spring G, bait-hooks H, slide I, and tripping-catch K, all arranged as and for the purpose described.

WILLIAM BALL.

Witnesses:
WILLIAM HAWKINS,
JOHN A. WING.